Nov. 29, 1932.   C. W. HANSEL   1,889,284
OPTICAL APPARATUS
Filed Jan. 23, 1931   2 Sheets-Sheet 1

INVENTOR
C. W. HANSEL

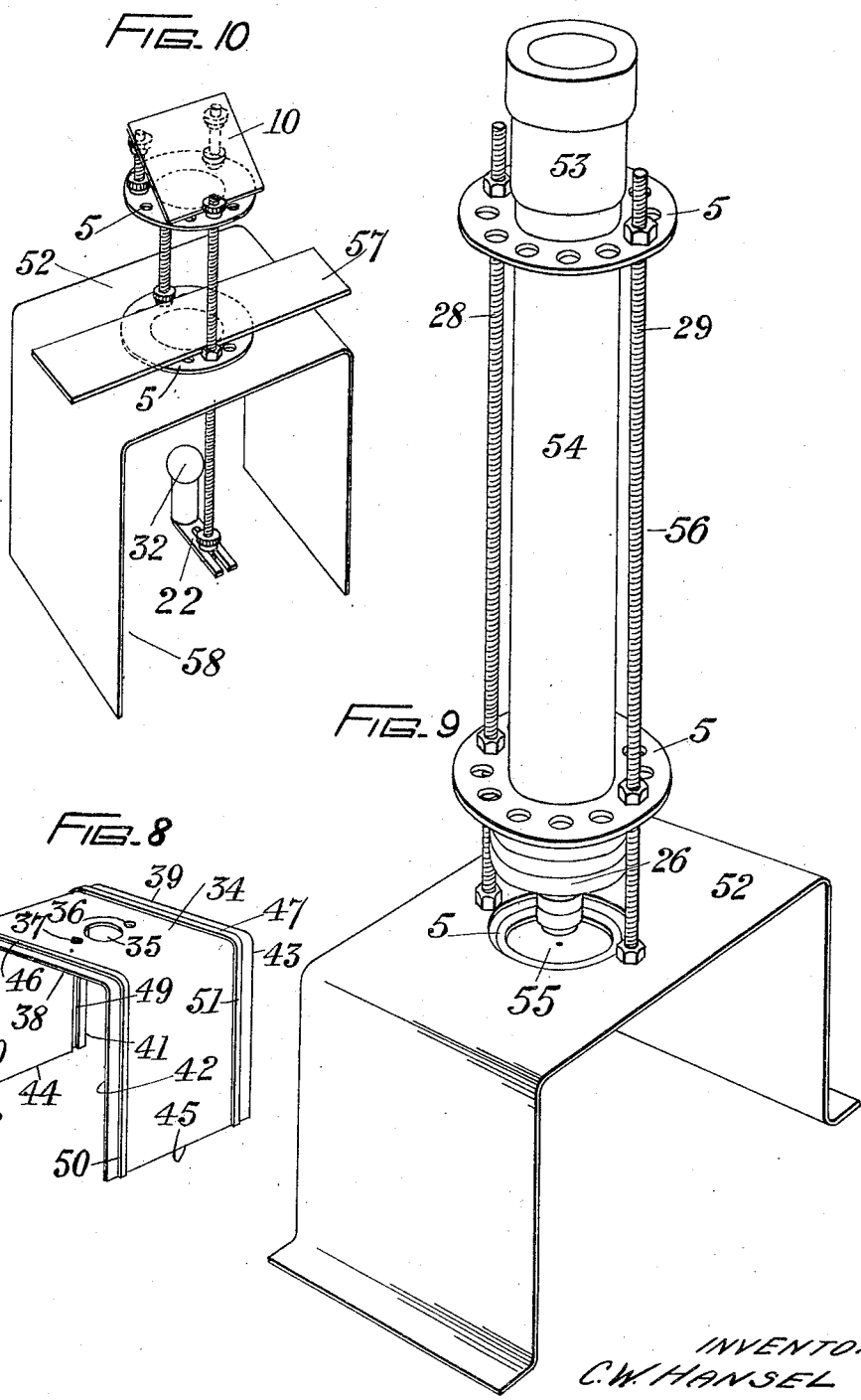

Patented Nov. 29, 1932

1,889,284

UNITED STATES PATENT OFFICE

CARL WILLIAM HANSEL, OF BEDFORD, ENGLAND

OPTICAL APPARATUS

Application filed January 23, 1931, Serial No. 510,795, and in Great Britain January 23, 1930.

Optical apparatus may consist of mechanical and optical elements associated together into articles such as toys, experimental models, optical instruments, apparatus for photography and optical projection and the like. Such articles may be employed as a means of instruction, for technical use, experimental investigation, or amusement. For these purposes it has been customary to provide specially constructed articles each peculiar to a definite purpose and with a limited range of application entailing a great deal of expense to the purchaser especially if it is desired to cover a wide range of optical investigation. Further, the mechanical and optical elements commonly employed in the construction of optical apparatus are so expensive and elaborate as to preclude use in free and extensive manner in all but a few well equipped laboratories. This is a hindrance to scientific education and prevents the popularization of science by means of toys and other simple and inexpensive devices.

This invention relates to an improved method of and means for constructing optical apparatus using a few simple mechanical and optical elements. These elements are standardized in form and size and designed for cheap production and for multiple use and association with one another, so that almost any form of optical apparatus may be provided at very low cost. The mechanical elements employed are also designed for association or dismemberment by means of screwed couplings so that after construction any piece of apparatus may, if desired, be dismembered and the same parts used in the construction of numerous other forms of apparatus or of the same type of apparatus in an alternative form. The mechanical elements are constructed for easy permanent or temporary association with optical elements by means of simple mechanical elements such as split rings, clips, grooved bars, and the like.

The mechanical elements are broadly of three types—carrier elements, screwed couplings, and auxiliary elements. Carrier elements may be provided with cuttings, grooves, recesses, projections, screw threads, and the like, to adapt them for association with one another and with optical elements. A carrier element is shaped and provided with one or more cuttings of suitable size and shape to enable it to be fixed at any point along a screwed coupling consisting of a screwed rod and fixing nuts. The screwed rod passes through the cutting and the carrier element is clamped to the rod by screwed nuts engaging with the rod and screwed up to the carrier unit on the two sides of the cutting as illustrated in the accompanying drawings. On occasion, a screwed bolt may be substituted for a screwed rod. Hereafter, the term "screwed coupling" will be restricted to mean the combination of a screwed rod (or bolt) and fixing nuts used in the way described. Any number of carrier units may be mounted at any desired distance apart along a screwed rod of suitable length, each carrier unit and any element carried by it being capable of rotation about the axis of the screwed rod. By a suitable location of cuttings of suitable size and shape in specially constructed carrier elements, a series of carrier elements and the components carried by them may be accurately centered using two or more screwed couplings as illustrated in the accompanying drawings. Auxiliary elements are also necessary such as split rings, opaque tubes, stops, grooved bars, spring clips, india-rubber bands, and the like. These must be of a suitable size but may be of simple form and there are comparatively few of them.

Optical elements consist chiefly of lenses, mirrors, plates, and discs. Usually, these are of standard sizes to permit of convenient and interchangeable association with the carrier elements by means of split rings, clips, india-rubber bands, and the like. The focal lengths of lenses and spherical mirrors should be chosen so that a small number of these suffices for the construction of the various forms of optical apparatus. Nicol prisms, piles of plates, eyepiece micrometers, and the like are easily accommodated to the carrier elements by means of the auxiliary elements already referred to.

The use of screwed couplings and suitable auxiliary elements enables the apparatus to be rapidly and easily assembled or dismembered without injury or mutilation of the parts.

The accompanying drawings illustrate the application of my invention to the construction of a few models, but it will be readily seen and understood that its application is not limited to instruments of this kind and that a great variety of articles and apparatus may be constructed with the same elements by the application of the method and means herein disclosed.

In the drawings:—

Figure 8 is a perspective view of a carrier element.

Figure 9 illustrates the construction used as a compound microscope.

Figure 10 illustrates the use of the construction for viewing a magnified image of a picture on the lantern slide.

Figure 1:
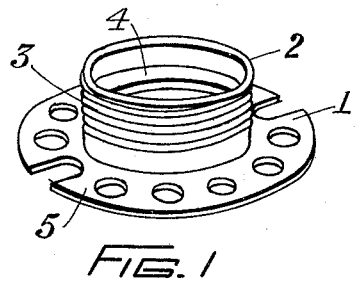
Figure 1 is a perspective view of the flange.

Fig. 1 illustrates a carrier element in the form of a flanged ring 5. In the one shown the flange 1 is provided with holes and slots and the ring 2 has a screw thread 3 on its outer surface and a shelf 4 projecting from its inner surface. Objects such as lenses, stops, discs, may be mounted on either side of the shelf and fixed, if necessary, by any conventional means. The shelf may also be used to hold a tube or similar object in position as in Fig. 9. The screw thread 3 enables screwed elements to be attached to the flanged ring such as the eyepiece shown in Fig. 9. The holes in the flange may be used one or more at a time as illustrated in Figs. 7, 2, 6, and 3.

Other forms of flanged ring could be used, for example, the flange could be provided with slots of any desired shape or number and the edge of the flange could be modified to adapt it for use with other mechanical elements as, for example, by providing the edge with a rim to adapt it for use with tubular elements. Again, any portion or the whole of the outer or inner surface of the ring could be smooth or screw threaded or could be provided with cuttings such as slots to accommodate a slide as in Fig. 6. Still further, other forms of projection from the inner surface could be used instead of a shelf. It is essential however that the flange should be provided with slots or the like to adapt it for use with one or more screwed couplings.

Figure 2:
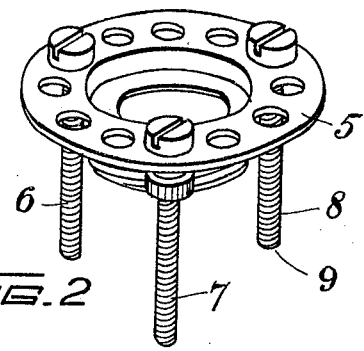
Figure 2 is a perspective view of the tripod stand.

Fig. 2 illustrates a tripod stand 9 consisting of the flanged ring 5 and three screwed couplings 6, 7, 8 each consisting of a screwed bolt and nut. A lens of suitable focal length may be mounted on the shelf of the flanged ring forming with the stand a simple magnifier or dissecting microscope. The tripod may also be used for mounting a glass prism in the construction of a simple spectroscope, for supporting a sphere for experiments on shadows, for mounting pictures in projection apparatus, and for other purposes.

Figure 3:
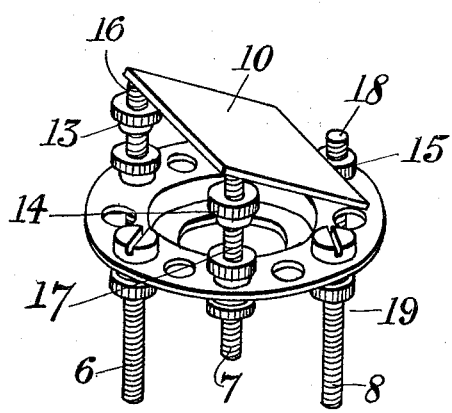
Figure 3 is a similar view showing the stand used as a support for a plate or plain mirror.

Fig. 3 illustrates how the tripod of Fig. 2 may be converted into a stand 19 for a plate or plane mirror 10 the inclination of which to the vertical is capable of adjustment by means of nuts 13, 14, 15, mounted on threaded pins 16, 17, 18. A similar arrangement is useful for deviating a beam of light through an angle as in periscopes, view finders, apparatus for projection, and the like.

Figure 4:
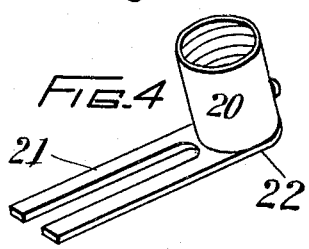
Figure 4 is a perspective view of the carrier element.
Figure 7:
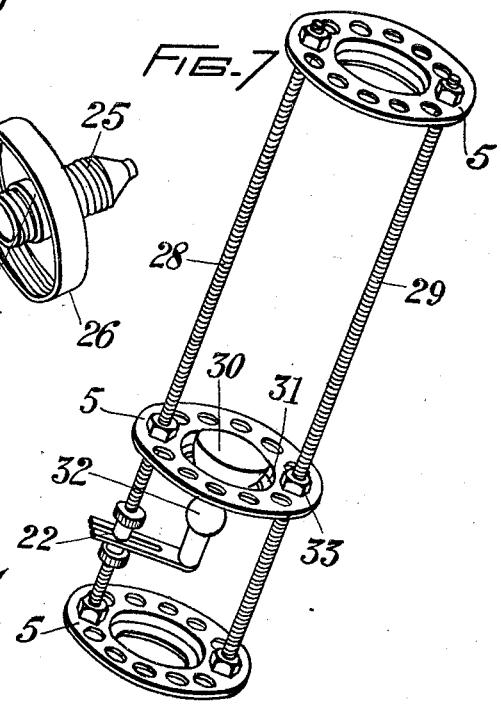
Figure 7 is a perspective view of an assembly arranged as a simple magnifier.

Fig. 4 illustrates a carrier element 22 for a lamp consisting of a lamp holder 20 attached to a slotted strip 21. The lamp carrier may be mounted in any position along a threaded rod as illustrated in Figs. 7 and 10. The strip 21 may be provided with cuttings other than a slot and its form may be varied for special purposes. For example, a portion of the strip may be perpendicular to the remainder of it and the strip may be extended beyond the lamp.

Figure 5:
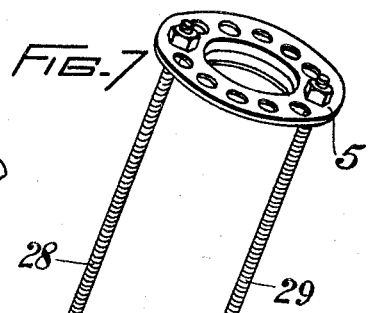
Figure 5 is a perspective view of an objective.

Figure 5 illustrates an objective 26. The outer part of it is screwed internally at 23 and at 24 so that the thread may engage with the screw-thread on the lens carrier 25, which carrier is so constructed that it can be reversed, if desired, so that the lens or lenses which it carries shall face inward, as in Figure 6, or outward, as in Figures 5 and 9.

Figure 6:
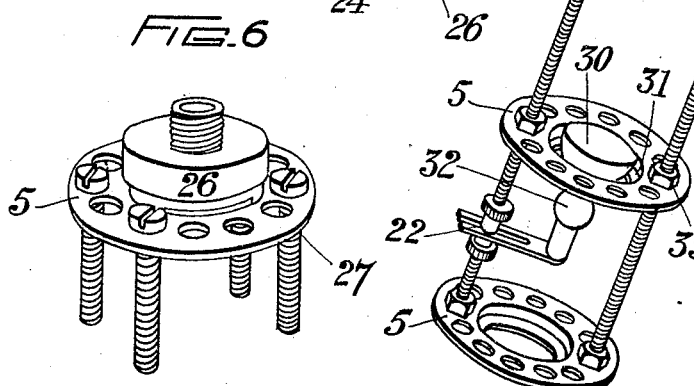
Figure 6 is a perspective view illustrating the combination of the tripod and the objective.

Fig. 6 illustrates a high power simple microscope 27 consisting of a four-legged stand similar to the tripod 9 of Fig. 2 and the objective 26 of Fig. 5. The flanged ring 5 is here shown provided with slots to accommodate a microscope slide.

Fig. 7 illustrates an assembly arranged as a simple magnifier 33 arranged for the examination of pond life contained in a watch glass 30 which acts as an aquarium. Artificial illumination is provided by a lamp 32 the light of which is diffused by means of a matt celluloid disc 31. A lens is carried in the upper flanged ring 5 and may be secured by any conventional means.

Fig. 7 shows how one or more mechanical units may be supported at continuously variable heights and at any desired distances from one another by substituting screwed rods 28, 29 for the screwed bolts in Figs. 2, 3, 6. It will be observed that the lowest flanged ring acts as a base or support for the rest of the apparatus which could be mounted more rigidly upon the carrier element illustrated in Fig. 8.

It may be noted that the various optical elements of the system are easily centered using the carrier elements and screwed rods in the manner indicated. Moreover, the carrier elements allow of sufficient adjustment for exact centering if the cuttings in the flanged rings are somewhat larger than the screwed rods passing through them.

Fig. 8 illustrates a carrier element 52 one face 34 of which is provided with holes 35, 36, 37, so spaced and of such size as to permit of useful association with the flanged ring 5 of Fig. 1. The hole 35 may be of any suitable diameter, for example it may engage with the external screw thread on the flanged ring 5 or it may be somewhat larger so that the ring portion of 5 passes through the hole 35 as in Fig. 10. The method of associating the flanged ring above or below the hole 35 of carrier element 52 by means of threaded rods is illustrated in Figs. 9 and 10. The edges of the carrier element 52 may be unmodified as shown in Fig. 8 or any or all of the edges may be modified for example edges 44, 45, or may be bent to form flanges as in Fig. 9. Fig. 8 also indicates how recesses 46, 47, 48, 49, 50, 51 could be provided so that plates of material could slide in them forming a box, the slides being transparent, semi-transparent, or opaque. Further, any face of carrier element 52 could be provided with additional cuttings, grooves, recesses, projections, and the like for accommodating other elements or components of the apparatus. Instead of using slides in element 52 additional box elements may be employed with all sides fixed.

Fig. 9 illustrates a compound microscope 56 constructed from elements already described together with an eyepiece 53, an opaque tube 54, and a disc with a central small hole 55. The eyepiece contains two plano-convex lenses fixed in position by means of split rings and readily removed when required for other purposes. The form of microscope shown avoids the use of one tube sliding within another while still providing all the necessary adjustment in a much less expensive manner.

The microscope of Fig. 9 may be converted into a projection microscope or a microphotographic apparatus by mounting a lamp and camera box in suitable positions relatively to the microscope. This may be done using threaded rods and the lamp carrier of Fig. 4 if the camera box is provided with cuttings such as 35, 36, 37 of Fig. 8.

Fig. 10 illustrates a combination of elements 58 for viewing a magnified image of a picture on a lantern slide 57. If the flanged rings 5 are not too far apart, an image is seen by looking horizontally into mirror 10. If the flanged rings are mounted further apart, the image may be projected on a screen. In this case it is advantageous to use opaque slides in the recesses of carrier element 52 to cut off stray light or to use a box of similar construction to element 52 but with opaque sides.

Similar apparatus may be used for the projection of opaque pictures and objects but in this case the lamp must be mounted so as to illuminate the object or picture from above and the matt celluloid disc 31 must be removed.

What I claim is:—

1. In a set of mechanical and optical elements capable of association to provide various different forms of optical apparatus, screwed rods, a carrier element, said carrier element being constructed to accommodate at least one other element of the set, and means for adjustably mounting the carrier element on the screwed rods, the said screwed rods being arranged in spaced parallel relation.

2. In a set of mechanical and optical elements capable of association to provide various different forms of optical apparatus, screwed rods, a ring element, said ring element being constructed to accommodate at least one other element of the set, and means for adjustably mounting the ring element on the screwed rods, the said screwed rods being arranged in spaced parallel relation.

3. In a set of mechanical and optical elements capable of association to provide various different forms of optical apparatus, screwed rods, a ring element, said ring element being constructed to accommodate a support for a lens carrier, in which support the lens carrier is reversibly mounted, and means for adjustably mounting the ring element on the screwed rods, the said screwed rods being arranged in spaced parallel relation.

4. In a set of mechanical and optical elements as claimed in claim 1, a carrier element in the form of a flanged ring having cuttings adapted to receive the screwed rods, and at least one screw-threaded portion adapted for screwed engagement with another element of the set.

5. In a set of mechanical and optical elements as claimed in claim 1, a carrier element in the form of a flanged ring having cuttings adapted to receive the screwed rods, and an internal surface provided with a projection for accommodating another element of the set.

6. In a set of mechanical and optical elements as claimed in claim 1, a mechanical element in the form of a lamp carrier, and means for adjustably mounting the lamp carrier on a screwed rod.

7. In a set of mechanical and optical elements as claimed in claim 1, a mechanical element in the form of a stand, and means for mounting the screwed rods in parallel spaced relation on the stand.

8. A set of mechanical and optical elements capable of association to provide various different forms of optical apparatus, including screwed rods, carrier elements, said carrier elements being adapted to accommodate other elements of the set, a stand, means for mounting the screwed rods in spaced parallel relation on the stand, and means for mounting the carrier elements in adjustable relation on the spaced parallel screwed rods.

In testimony whereof I affix my signature.

CARL WILLIAM HANSEL.